Figure 1:
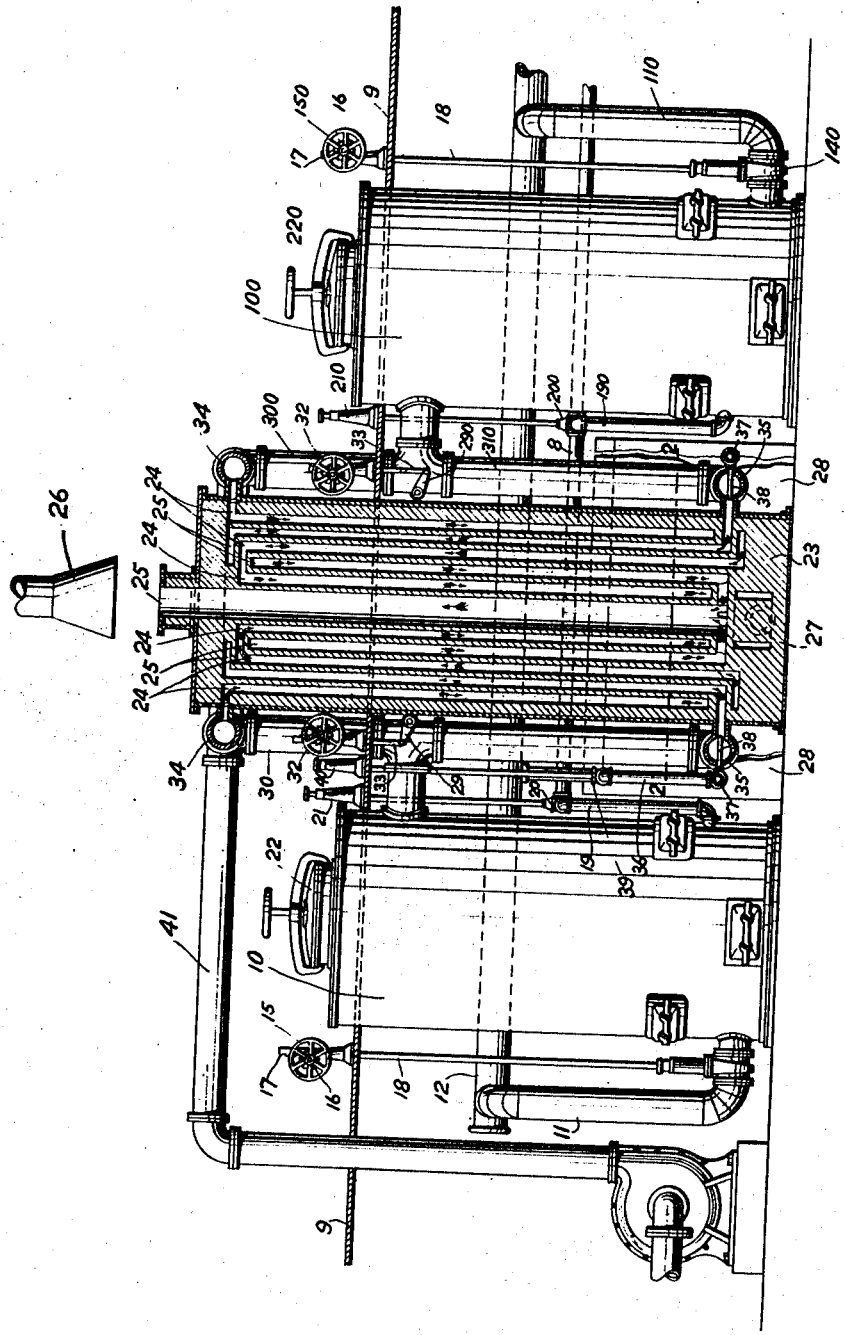

P. S. SMITH.
APPARATUS FOR RECOVERING SULFUR FROM SULFUR BEARING GASES.
APPLICATION FILED JUNE 10, 1908.

945,112.

Patented Jan. 4, 1910.
2 SHEETS—SHEET 1.

WITNESSES:
E. E. Wall
A. M. Urian

INVENTOR
Paul S. Smith
BY
Harding Harding
ATTORNEYS.

UNITED STATES PATENT OFFICE.

PAUL S. SMITH, OF NEWBURGH, NEW YORK, ASSIGNOR TO THE E. I. DU PONT DE NEMOURS POWDER COMPANY, OF WILMINGTON, DELAWARE, A CORPORATION OF NEW JERSEY.

APPARATUS FOR RECOVERING SULFUR FROM SULFUR-BEARING GASES.

945,112.

Specification of Letters Patent.

Patented Jan. 4, 1910.

Original application filed December 3, 1907, Serial No. 404,890. Divided and this application filed June 10, 1908. Serial No. 437,646.

*To all whom it may concern:*

Be it known that I, PAUL S. SMITH, a citizen of the United States, residing at Newburgh, county of Orange, and State of New York, have invented a new and useful Improvement in Apparatus for the Recovery of Sulfur from Sulfur-Bearing Gases, of which the following is a full, clear, and exact description, reference being had to the accompanying drawings, which form a part of this specification.

This application is a division of an application filed by me December 3d, 1907, Serial No. 404,890, on which issued Patent No. 912,744, dated Feb. 16, 1909, and claims the apparatus which is described in said patent as the means whereby the process claimed therein is preferably practiced.

In a patent issued to me February 11, 1908, No. 878,569, I have set forth a process and apparatus for recovering sulfur from sulfur dioxid in which producer-gas and water-gas is successively formed and the water-gas mixed with the sulfur dioxid and the mixed gases heated by the combustion of the producer-gas, thereby causing the mixed gases to react with evolution of sulfur vapor. In said process and apparatus the producer-gas and water-gas, alternately formed in the gas producer, are led respectively to storage tanks from which, as required, the two gases are separately led to the reducer. This process and apparatus are operative and comparatively efficient and economical, but the present invention has for its object to greatly enhance the efficiency and economy of the process by such modifications therein as will enable the producer-gas and water-gas to be manufactured continuously instead of alternately, and to be led, immediately upon their formation, to the reducer. In my prior application, while both water-gas and producer-gas are led continuously to the reducer, the storage of each gas, necessitated by the intermittent nature of its manufacture, causes a drop in its temperature, thus requiring an expenditure of a certain amount of energy to elevate it to its temperature of combustion or reaction. My present invention, by providing for the continuous manufacture of both gases, dispenses with the necessity of temporarily storing either and permits of both gases being led immediately to the reducer, thus enabling the process to be carried on with maximum efficiency and economy.

Figure 2:
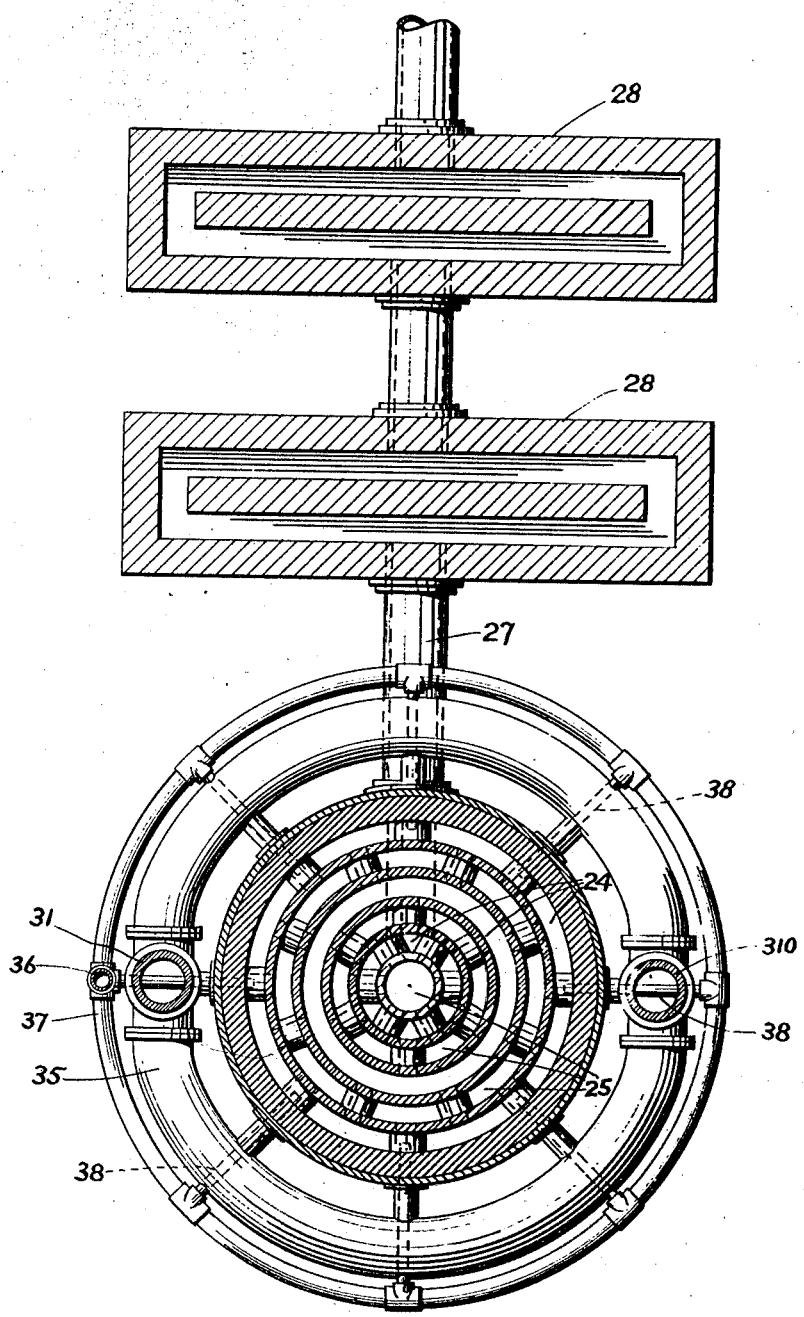

In the drawings: Figure 1 represents a side elevation, partly in section, of my improved apparatus; Fig. 2 is a section on the line 2—2 of Fig. 1.

10 and 100 are two gas-producers or generators provided with grates and lined with fire-brick.

11 and 110 are pipes leading from the blast main 12, into which air is blown by suitable means, the admission of air to the generators 10 and 100 being controlled by the blast-gates 14 and 140, which are operated from the working platform by means of the hand wheels 15 and 150. Each hand wheel is connected with its corresponding blast-gate by means of a pinion 16 on the hand wheel engaging a rack 17 on a rod 18 attached to the blast-gate.

19 and 190 are pipes leading from the steam header 8, by means of which steam under pressure is supplied beneath the grates of the generators 10 and 100, these pipes being controlled by valves 20 and 200 that are operated from the working platform 9 by means of the floor stands 21 and 210.

22 and 220 are covers which are removable for the purpose of charging the generators 10 and 100 with fuel.

23 is a retort which consists of a steel shell lined with fire-brick and provided with interior fire-brick work arranged to form two sets of annular passages or chambers 24 and 25, the passages 24 alternating with the passages 25, and the passages of each set communicating one with another alternately at the top and bottom, thereby affording two sets of staggered passages, the passages of one set being separated from the passages of the other set by a single partition of fire-brick. The innermost of the passages 25 is of tubular shape and leads to the stack 26. The innermost of the passages 24 communicates, at its lower or outlet end, with the pipe 27, leading to the condensing system 28.

29 and 290 are two-way valves, by means of which the gases from the generators 10 and 100 may be diverted, through the pipes 30 and 300, to the annular pipe 34 at the top of the retort, or through the pipes 31 and 310 to the annular pipe 35 at the bottom of the retort. Each valve 29 or 290 is operated by means of a hand wheel 32 whose shaft engages a rack on a rod 33 attached to the valve. The annular pipe 34 communicates with the outer passage of the set of passages 24 within the retort, and the annular pipe 35 communicates with the outer passage of the set of passages 25 within the retort.

36 is a pipe leading from the blast main 12 to an annular pipe 37 surrounding the annular pipe 35 and having branch injector pipes 38 extending into or through the pipe 35 for the purpose of supplying air to the passages 25, these pipes being controlled by means of the valve 39 operated from the working platform by means of the floor stand 40.

41 is a pipe leading from a source of supply of sulfur dioxid to the pipe 34.

The following conditions are represented in the drawings. The fuel in the generator 10 is being raised to the proper temperature for making water-gas, and the blast from the pipe 11 passes upward through the fuel in the generator 10, forming producer-gas, which passes down through the pipes 31 and 35 to the lower part of the retort 23, where an auxiliary blast of air is supplied by the pipes 38. By this supply of air, the producer-gas is ignited, and in its passage successively upward, downward and upward through the passages 25, the bricks are raised to a bright red heat, the waste gases finally escaping through the stack 26 into the air. It is assumed that when the blast is put in operation on the generator 10, as described, for the purpose of bringing the fuel in the generator 10 to the temperature of maximum efficiency for the formation of water-gas, the fuel in the generator 100 has already been brought to a suitable high temperature by similar means. The valve 140 has been shifted to close pipe 110 and the steam valve 200 has been opened, admitting steam beneath the grate of the generator 100. The steam passing upward through the incandescent fuel is disassociated with formation of water-gas which passes through pipe 300 to pipe 34, where it mixes with the sulfur dioxid from the pipe 41. Thence the mixed gases pass to the upper part of the retort and successively downward, upward and downward through the passages 24 in contact with the red hot brick-work that has been heated and in continuing to be heated by the burning producer-gas, resulting in evolution of sulfur. The sulfur vapor so formed, together with the other products of the reaction, water vapor and carbon monoxid, pass through the pipe 27 to the condensing system 28, in contact with the cooling surface of which the hot gases fall to such a temperature that the sulfur vapor condenses; first to a liquid in the hotter part of the condensing system, and finally to solid flowers of sulfur in the cooler portions. It is assumed that the continued operation of the air blast has restored the fuel in generator 10 to its temperature of maximum efficiency for the formation of water-gas. At the same time the continued production of water-gas in the generator 100 has reduced the temperature of the fuel below the point of maximum efficiency for the formation of water-gas. The air blast is now shut off from generator 10 and the steam valve 20 opened to admit steam beneath the grate for the purpose of forming water-gas, and the valve 29 is shifted to divert such gas to the pipes 30 and 34. At the same time, the steam valve 200 is closed and the air blast is applied to the generator 100 for the purpose of forming producer gas, and the valve 290 is shifted to divert such gas to the pipes 310 and 35. The system of valves now presents relations the reverse of those indicated in the drawing, although so far as the retort 23 is concerned, there is no interruption of the continuous flow of burning producer-gas through the passages 25 or of the continuous flow of mixed gases (sulfur dioxid and water-gas) through the passages 24. Further, the firebrick work is maintained at a constant high temperature.

If the quantity of producer-gas evolved is more than sufficient to maintain the firebrick work at the requisite temperature, a part of the same may be diverted by any suitable branch pipes, not necessary to specifically show, or the secondary air-blast may be cut off, thereby preventing the ignition of the producer-gas.

In an application filed of even date herewith Serial No. 437,645 I have shown and described another apparatus for recovering sulfur from sulfur dioxid having certain features in common with the specific apparatus hereinbefore described. The apparatus set out in the claims herein is a specific embodiment of the invention common to the apparatus of the two applications, which invention is broadly claimed in said application No. 437,645.

Having now fully described my invention, what I claim and desire to protect by Letters Patent is:

1. In an apparatus for the recovery of sulfur from sulfur dioxid, the combination with a plurality of generators and steam pipe and air pipe connections to each generator, pipe connections from a source of supply of sulfur dioxid and from each generator, enabling the sulfur dioxid to be mixed with water-gas generated by either generator, a condensing system, a retort common to all of said pipe connections between the juncture of said pipe connections and said condensing system, and pipe connections from each generator to the retort, permitting producer gas to be led to the retort and by its combustion to supply the heat required for the reaction of the mixed gases.

2. In an apparatus for the recovery of sulfur from sulfur dioxid, the combination with a plurality of water-gas generators and a single retort, of a valve-controlled steam pipe and a valve-controlled air pipe communicating with each generator, an annular mixing pipe at one end of the retort, two contiguous sets of passages within the retort, one set of which communicates with said mixing pipe, a pipe for conveying sulfur dioxid to the mixing pipe, an annular pipe at the other end of the retort communicating with the other set of passages, a condenser communicating with the first set of passages, an auxiliary air blast communicating with the second set of passages, and valve-controlled pipe connections from each generator to both annular pipes.

3. In an apparatus for the recovery of sulfur from sulfur dioxid, the combination with a plurality of water-gas generators and a single retort, said retort comprising a series of concentric chambers or passages, alternate passages having ports communicating with each other and the communicating ports being arranged successively at opposite ends of the retort, thereby providing two sets of passages in which any passage of either set is contiguous to a passage of the other set, valve-controlled pipe connections from each generator to the two sets of passages respectively, means to convey sulfur dioxid to one set of passages and a condenser communicating with the last named set of passages.

In testimony of which invention, I have hereunto set my hand, at Newburgh, on this fourth day of June, 1908.

PAUL S. SMITH.

Witnesses:
SLOAN LAMONT, Jr.,
RALPH H. SMITH.